United States Patent
Patel et al.

(10) Patent No.: US 9,769,622 B2
(45) Date of Patent: Sep. 19, 2017

(54) INDOOR LOCATION SURVEY ASSISTED BY A MOTION PATH ON A VENUE MAP

(71) Applicant: Apple Inc., Cupertino, CA (US)

(72) Inventors: Abhinav R. Patel, Mountain View, CA (US); Darin Tay, Sunnyvale, CA (US); David Benjamin Millman, Mountain View, CA (US); Jessica Noel Tsoong, Palo Alto, CA (US); Joseph Ding-Jiu Huang, Kingston (CA); Robert Mayor, Half Moon Bay, CA (US); Vitali Lovich, San Jose, CA (US); Vojislav Samsalovic, Saratoga, CA (US); Ashish Agarwal, Sunnyvale, CA (US); Mithilesh Kumar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 14/503,153

(22) Filed: Sep. 30, 2014

(65) Prior Publication Data

US 2015/0350845 A1    Dec. 3, 2015

Related U.S. Application Data

(60) Provisional application No. 62/005,988, filed on May 30, 2014.

(51) Int. Cl.
*H04W 4/04*    (2009.01)
*H04W 16/00*    (2009.01)
(Continued)

(52) U.S. Cl.
CPC .............. *H04W 4/028* (2013.01); *G01S 5/021* (2013.01); *G01S 5/0236* (2013.01); *G01S 5/0252* (2013.01); *H04W 4/04* (2013.01)

(58) Field of Classification Search
CPC ......... H04W 4/028; H04W 4/04; H04W 4/02; H04W 16/00; H04W 16/18; H04W 4/20;
(Continued)

(56) References Cited

U.S. PATENT DOCUMENTS 7,397,424 B2    7/2008    Houri
7,856,234 B2    12/2010    Alizadeh-Shabdiz et al.
(Continued)

FOREIGN PATENT DOCUMENTS

WO    WO 2011/077166    6/2011
WO    WO 2013/110971    8/2013
WO    WO 2013/110971 A1 *    8/2013    ............ H04W 64/00

OTHER PUBLICATIONS

International Search Report and Written Opinion in International Application No. PCT/US2015/032736, mailed Sep. 11, 2015, 13 pages.

*Primary Examiner* — Meless Zewdu
(74) *Attorney, Agent, or Firm* — Fish & Richardson P.C.

(57) ABSTRACT

Methods, systems, and computer program product for generating location fingerprint data for a venue are described. A sampling device surveying a venue can move inside the venue. While the sampling device moves, the sampling device can record environmental readings including, for example, strengths of signals from multiple radio signal sources. The sampling device can take the recording at fixed or various time intervals. Meanwhile, the sampling device can determine, based on a starting point and motion sensor readings, an estimated location of the mobile device for each time the sampling device takes the recordings. The sampling device can display a motion path of the estimated locations and a user interface item for receiving a user input for correcting the estimated locations. The sample device can tag the recorded environmental readings with the corrected (Continued)

locations, and submit the tagged readings to a server for determining a location fingerprint for the venue.

42 Claims, 9 Drawing Sheets

(51) Int. Cl.
| | | |
|---|---|---|
| *H04W 16/20* | (2009.01) | |
| *H04W 16/22* | (2009.01) | |
| *H04W 4/02* | (2009.01) | |
| *G01S 5/02* | (2010.01) | |

(58) Field of Classification Search
CPC ..... H04W 4/005; H04W 4/043; H04W 4/021; H04W 4/025; H04W 4/026; H04W 4/027; H04W 4/0185; H04W 4/022; H04W 16/20; H04W 16/22; H04W 16/26; H04W 16/225; G01S 5/0252; G01S 5/0236; G01S 5/021; G01S 5/02; H04M 1/72522
See application file for complete search history.

(56) References Cited

U.S. PATENT DOCUMENTS

| | | | |
|---|---|---|---|
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,369,264 B2 | 2/2013 | Brachet et al. | |
| 8,478,297 B2 | 7/2013 | Morgan et al. | |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Brachet et al. | |
| 9,020,687 B2 | 4/2015 | Mendelson | |
| 9,204,251 B1 | 12/2015 | Mendelson | |
| 9,204,257 B1 | 12/2015 | Mendelson | |
| 2010/0039929 A1* | 2/2010 | Cho | G01S 5/0252 370/216 |
| 2011/0018732 A1* | 1/2011 | Cho | G01S 5/0236 340/8.1 |
| 2011/0090081 A1 | 4/2011 | Khorashadi et al. | |
| 2011/0231357 A1* | 9/2011 | Cho | G06Q 10/06 706/52 |
| 2011/0241882 A1* | 10/2011 | Gonzales | G06Q 30/0281 340/572.1 |
| 2012/0015665 A1* | 1/2012 | Farley | G01S 5/0036 455/456.1 |
| 2012/0029817 A1* | 2/2012 | Khorashadi | G01C 21/20 701/451 |
| 2012/0064855 A1 | 3/2012 | Mendelson | |
| 2012/0072106 A1* | 3/2012 | Han | G01C 21/206 701/410 |
| 2012/0191512 A1* | 7/2012 | Wuoti | G06Q 30/0207 705/14.1 |
| 2012/0274642 A1* | 11/2012 | Ofek | G06T 17/05 345/441 |
| 2013/0066550 A1* | 3/2013 | Takada | G01C 21/3682 701/454 |
| 2013/0281111 A1* | 10/2013 | Syrjarinne | H04W 64/00 455/456.1 |
| 2014/0129136 A1 | 5/2014 | Celia | |
| 2014/0148196 A1* | 5/2014 | Bassan-Eskenazi | G01S 11/02 455/456.1 |
| 2014/0335893 A1* | 11/2014 | Ronen | G01S 5/0252 455/456.1 |

\* cited by examiner

INDOOR LOCATION SURVEY ASSISTED BY A MOTION PATH ON A VENUE MAP

CROSS-REFERENCE TO RELATED APPLICATIONS

This application claims priority to U.S. Provisional Application No. 62/005,988, entitled "Indoor Location Survey," filed May 30, 2014, the entire contents of which are incorporated herein by reference.

TECHNICAL FIELD

This disclosure relates generally to location determination.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places where a mobile device does not have a line of sight with GPS satellites, GPS location determination can be error prone. For example, a conventional mobile device often fails to determine a location based on GPS signals when the device is inside a building or tunnel. In addition, even if a mobile device has lines of sight with multiple GPS satellites, error margin of GPS location can be in the order of tens of meters. Such error margin may be too large for determining on which floor of a building the mobile device is located, and in which room of the floor the mobile device is located.

SUMMARY

Surveying techniques for generating location fingerprint data for a venue are described. A sampling device surveying a venue can move inside the venue. While the sampling device moves, the sampling device can record environmental readings including, for example, strengths of signals from multiple radio signal sources. The sampling device can take the recording at fixed or various time intervals. Meanwhile, the sampling device can determine, based on a starting point and motion sensor readings, an estimated location of the mobile device for each time the sampling device takes the recordings. The sampling device can display a motion path of the estimated locations and a user interface item for receiving a user input for correcting the estimated locations. The sample device can tag the recorded environmental readings with the corrected locations, and submit the tagged environmental readings to a server for determining a location fingerprint for the venue.

The features described in this specification can be implemented to achieve the following advantages. Compared to conventional techniques for generating location fingerprint data, the surveying techniques described in this specification can make surveying a venue easier for a surveyor carrying the sampling device. For example, the surveyor need not input a destination and specify a path to that destination. The sampling can automatically track the path, such that unexpected interruptions, e.g., a locked door preventing the surveyor from continuing, do not interfere with the survey. As a result, the techniques may provide higher quality data for determining the location fingerprints.

The details of one or more implementations of indoor location survey techniques are set forth in the accompanying drawings and the description below. Other features, aspects, and advantages of the indoor location survey techniques will become apparent from the description, the drawings, and the claims.

BRIEF DESCRIPTION OF THE DRAWINGS

Like reference symbols in the various drawings indicate like elements.

DETAILED DESCRIPTION

Exemplary Location Survey

Figure 1:
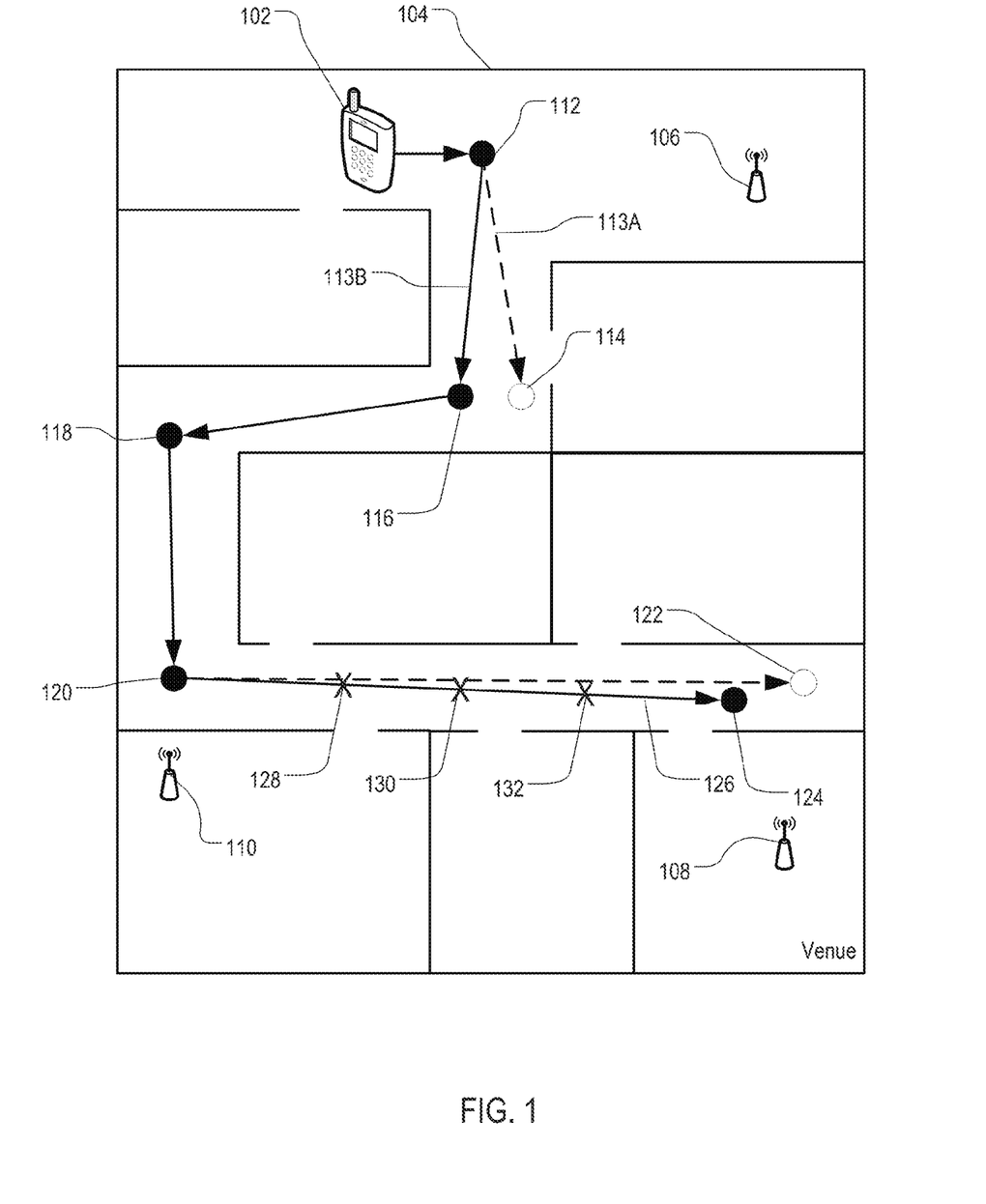
FIG. 1 is a diagram illustrating exemplary indoor location survey techniques.

FIG. 1 is a diagram illustrating exemplary indoor location survey techniques. Sampling device 102 can be a mobile device implementing features of location survey. Sampling device 102 can be carried by a surveyor at venue 104, and be programmed to survey venue 104 for populating a location fingerprint database. The surveyor can be a human or a vehicle programmed to move around at venue 104.

Venue 104 can be a space having a structure that has finer structural granularity than available granularity of GPS or WiFi™ triangulation. The structure of venue 104 can include one or more constraints limiting a person's movement in the space. These constraints can include, for example, map constraints (e.g., walls, railings, or cubicle separators), pathway constraints (e.g., a pedestrian walking on a pathway defined by road signs tends to follow the pathway), or pedestrian motion constraints (e.g., a pedestrian cannot move faster than X miles per hour, or move vertically when not in a stairway or elevator). Venue 104 can be a physical structure. The physical structure can be closed (e.g., an office building) or open (e.g., an open stadium). The space can be indoor space inside of the physical structure, or space inside of a bounding space of the physical structure if the physical structure is open. Venue 104 can be mobile (e.g., an airplane, a cruise ship, or a mobile oil platform).

Surveying venue 104 can include recording environmental readings at venue 104 while sampling device 102 moves in venue 104. The environmental readings can be measurements of signals from signal sources (e.g., signal sources 106, 108, and 110) at various locations (e.g., locations 112 and 116) at venue 104. Each of signal sources 106, 108, and 110 can include a radio frequency (RF) signal transmitter, e.g., a wireless access point. Measuring the signals from signal sources 106, 108, and 110 can include performing a channel scan at locations 112 and 116. The channel scan can be a scan of all standard RF channels of signal sources 106, 108, and 110. If a signal is detected in a channel scan, sampling device 102 can measure one or more aspects of the signal. For example, sampling device 102 can measure a received signal strength indication (RSSI) or a round trip time or both. Sampling device 102 can record the measurements in association with an identifier of each of signal sources 106, 108, and 110. The identifier can be a media access control (MAC) address or a service set identification (SSID) of the respective signal source.

Sampling device 102 can start taking measurements at an arbitrary location, e.g., location 112. A surveyor carrying sampling device 102 can walk in any direction following any path. A motion sensor, e.g., an accelerometer, can measure acceleration caused by walking steps of the surveyor. Sampling device 102 can use the measurement, in association with a digital compass of sampling device 102, to determine a travel speed, travel distance, and bearing. Sampling device 102 can then determine a motion path, e.g., motion path 113A. Motion path 113A can be a path linking two anchors. Each anchor can be a place in venue 104 where a user designates with a marker on sampling device, or a place in venue 104 where sample device determines that a changing of direction has occurred.

For example, a first anchor can be associated with location 112, which is a place designated as a starting point, or starting location, for the survey by the user. A second anchor can be associated with location 114, which is an estimated location of sampling device 102, as determined from the motion sensor and compass readings. Motion path 113A links the starting point and the estimated location.

The anchor associated with estimated location 114 can be moved in response to a user input. The surveyor may have a larger or smaller stride than an average person has. The compass of the sampling device 102 may be affected by various interferences. Accordingly, the estimated location 114 may be an inaccurate location of sampling device 102. The surveyor may correct the inaccuracy by indicating that sampling device 102 is located at location 116. Sampling device 102 can then adjust motion path 113A to motion path 113B. Sampling device 102 can make the adjustment during the survey, e.g., while sampling device 102 moves in venue 104, or after the survey.

Sampling device 102 can move to next locations 118, 120, and 122. Each of next locations 118, 120, and 122 can be an estimated location. Sampling device 102 can receive a user input to adjust estimated location 122 to location 124.

Sampling device 102 can tag environmental readings with waypoints along a motion path. For example, sampling device 102 can determine that traveling from location 120 to location 124 took 20 seconds along adjusted motion path 126, which is 28 meters long. During the 40 seconds, sampling device 102 recorded three sets of environmental readings, at 5th, 10th, and 15th seconds, respectively. Sampling device 102 can determine waypoints 128, 130, and 132 at the 7, 14, and 21 meters from location 120, respectively. Sampling device 102 can associate the locations of waypoints 128, 130, and 132 with the three sets of environmental readings. Sampling device 102, or a location server coupled to sampling device wirelessly, can determine expected environmental readings by a user device if the user device is located at waypoints 128, 130, and 132. The expected readings can be designated as a portion of a location fingerprint of venue 104. The user device can use the location fingerprint of venue 104 to estimate where the user device is located in venue 104.

Exemplary User Interface

Figure 2:
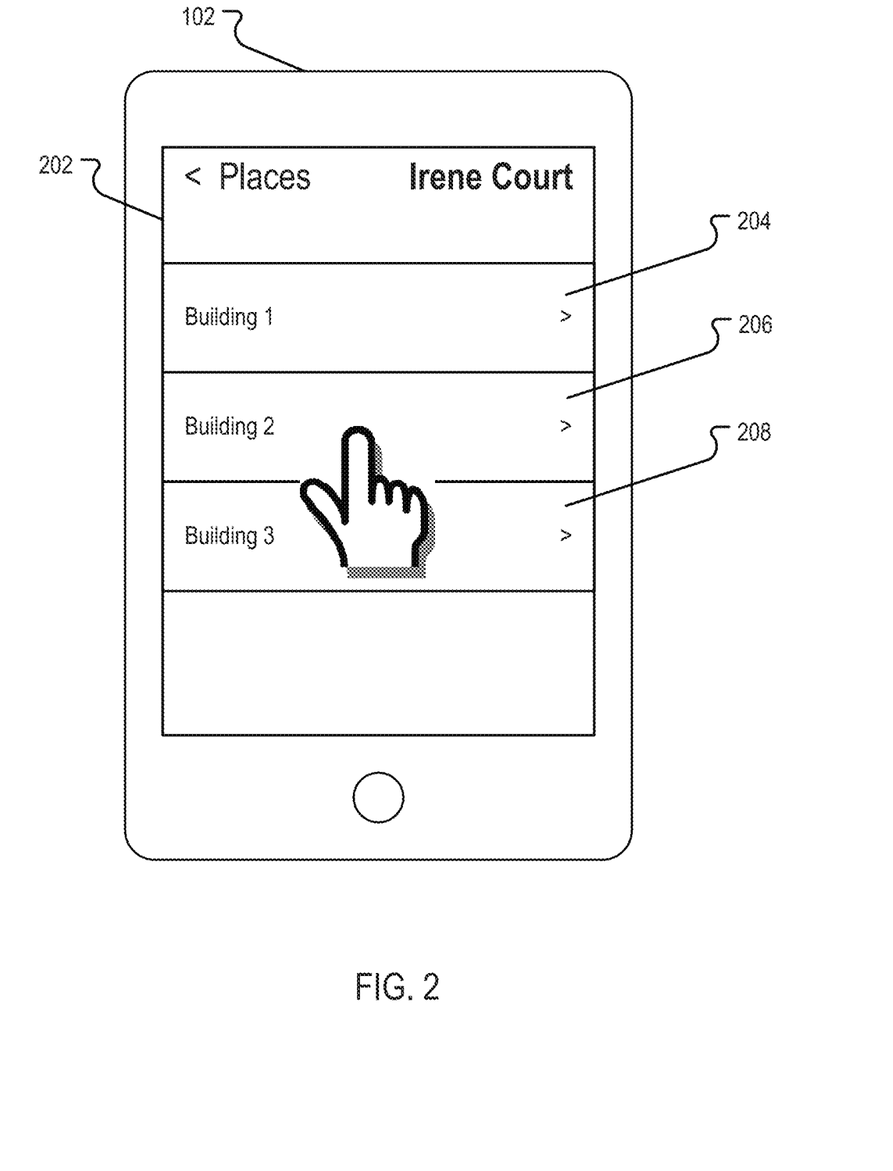
FIG. 2 illustrates an exemplary user interface for selecting a venue to perform location survey.

FIG. 2 illustrates an exemplary user interface 202 for selecting a venue to perform location survey. User interface 202 can be displayed on sampling device 102.

Sampling device 102 can receive a user input from a surveyor to execute a survey application program. The survey application program, upon launching, can display a list of places. Sampling device 102 may download the list from a venue service. The venue service can include a map pipeline for indoor venues. Each place may include a group of one or more venues. Sampling device 102 can receive a user input to select a place, e.g., "Irene Court." Upon selection, sampling device 102 can display user interface 202 associated with the selected places.

User interface 202 can include user interface items 204, 206, and 208, each corresponding to a venue, e.g., a building, at the selected place. Each user interface item 204, 206, and 208 can receive a user input selecting the corresponding venue to survey. Upon receiving a user input selecting one of the user interface items, e.g., user interface item 206, sampling device can display a user interface for selecting a floor among multiple floors of the corresponding venue.

Figure 3:
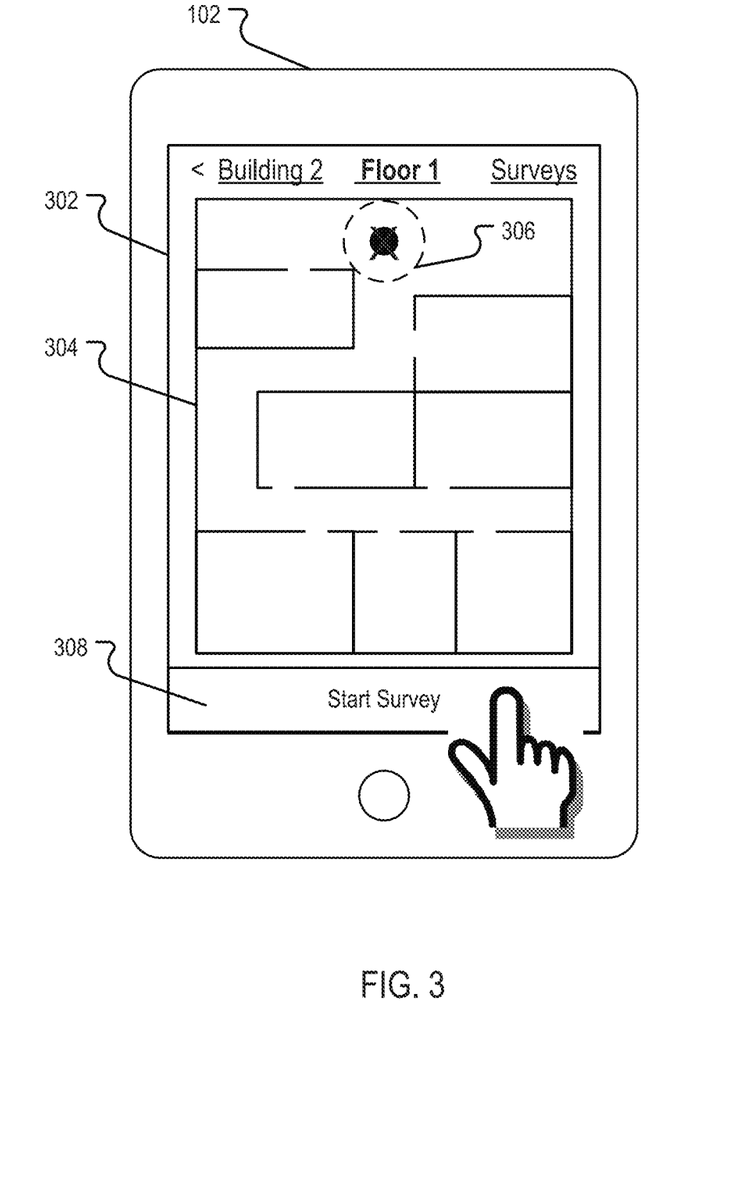
FIG. 3 illustrates an exemplary user interface for starting a location survey.

FIG. 3 illustrates an exemplary user interface 302 for starting a location survey. Upon receiving a user selection of a floor of a venue (FIG. 2), sampling device 102 can display user interface 302. User interface 302 can include control items for selecting another venue, selecting another floor, and opening a previously saved survey. User interface 302 can include map 304 of the currently selected floor, e.g., first floor of venue 104 (of FIG. 1). The survey application program can preload map 304 on sampling device 102, e.g., by downloading map 304 from a venue service provided by a location server. At time of performing the survey, sampling device 102 may or may not be connected to the venue service.

Map 304 can receive a user input, e.g., a touch input, to designate a starting location for a survey. Upon receiving the user input, sampling device 102 can display marker 306 corresponding to the starting location. User interface 302 can include start survey user interface item 308. Upon receiving a user input on start survey user interface item 308, sampling device 102 can start survey by recording environmental readings of sensors of sampling device 102 and determining motion path or paths of sampling device 102.

Figure 4:
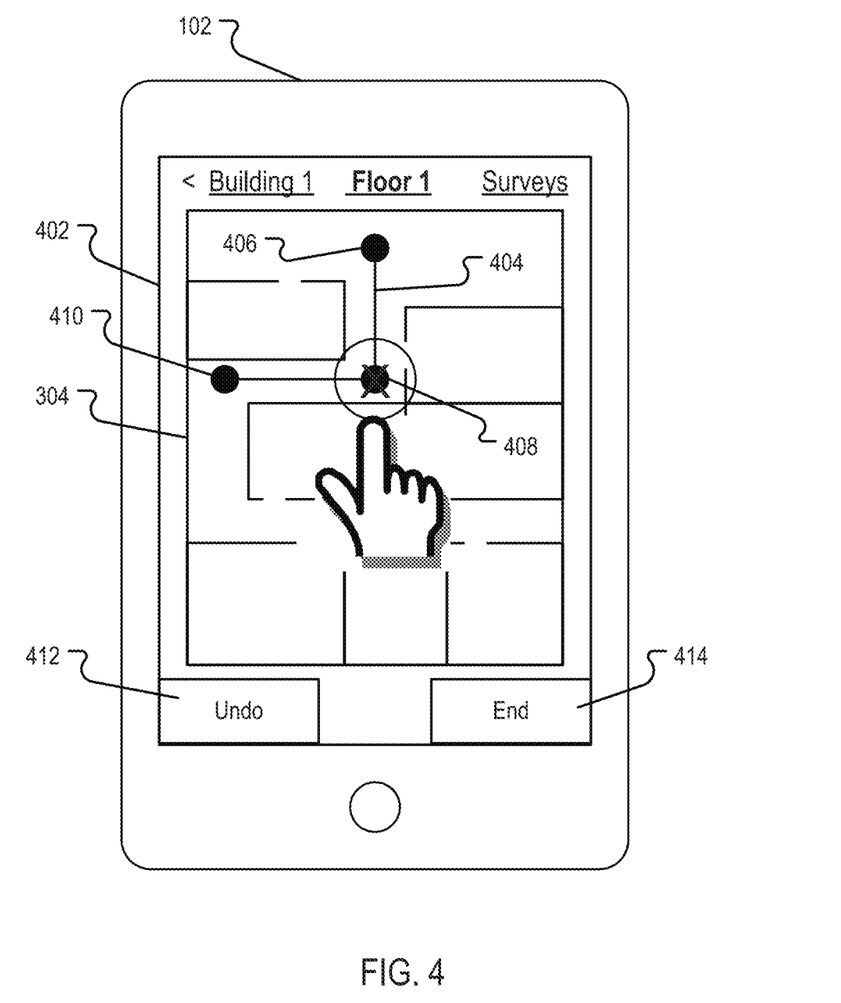
FIG. 4 illustrates an exemplary user interface for modifying an estimated motion path.

FIG. 4 illustrates an exemplary user interface 402 for modifying an estimated motion path. While performing the survey, sampling device 102 can display motion path 404 overlaying on map 304. Motion path 404 can connect multiple anchors 406, 408, and 410. Each of anchors 406, 408, and 410 can correspond to a user input location or estimated location of sampling device 102 while sampling device 102 moves in the venue being surveyed. Each anchor can be represented by a marker on map 304. For example, anchor 406 can correspond to a user specified starting location. Anchor 408 can correspond to a first estimated location where sampling device 102 changed moving directions. Anchor 410 can correspond to a second estimated location where sampling device 102 changed moving directions. Each of anchors 406, 408, and 410 can be modified in response to a user input on the corresponding marker. For example, sampling device 102 can receive a user input, e.g., a drag input, moving the marker representing anchor 408. In response, the sampling device 102 can move the corresponding anchor to a new location where the marker is dropped. The shape of motion path 404 can move according to movement of anchor 408.

User interface 402 can include undo button 412. Undo button 412 can be a virtual button configured to receive a user input for undoing the change of location of an anchor. User interface 402 can include end survey button 414. Upon receiving a user input through end survey button 414, sampling device can save the survey and exit the survey application program.

Exemplary Surveying Device

Figure 5:
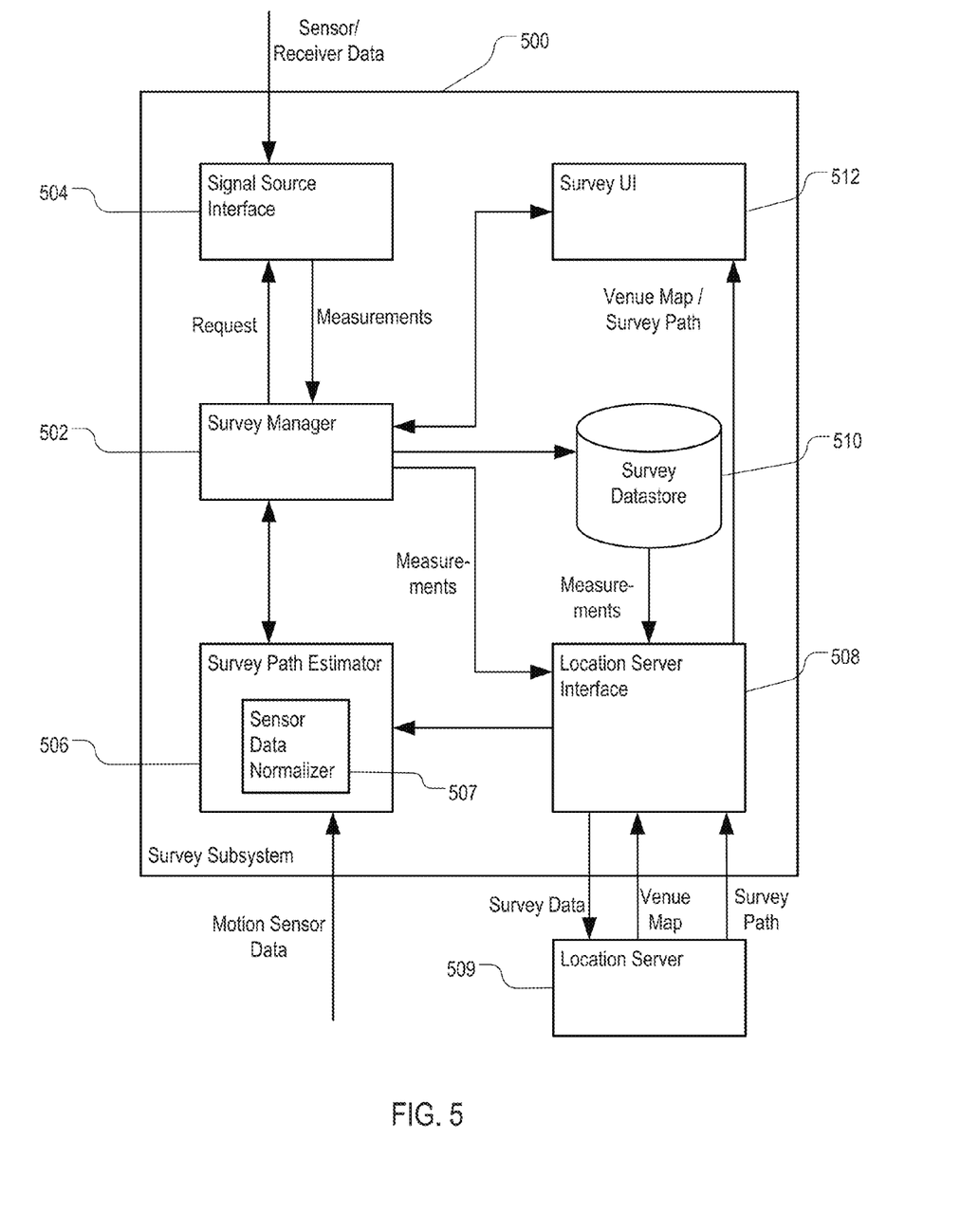
FIG. 5 is a block diagram illustrating components of an exemplary location survey subsystem of a mobile device.

FIG. 5 is a block diagram illustrating components of exemplary survey subsystem 500 of sampling device 102. Survey subsystem 500 can include hardware or software components for conducting location surveys for populating a location fingerprint database.

Survey subsystem 500 can include survey manager 502. Survey manager 502 is a component of survey subsystem 500 configured to manage location surveying functions. Survey manager 502 can provide rules for scanning channels, recording measurements, determining locations at which measurements are recorded, and managing measurement data. Survey manager 502 can receive measurement data from signal source interface 504.

Signal source interface 504 is a component of survey subsystem 500 configured to interface with the one or more sensors or receivers of sampling device 102 and provide measurements of the signals and identifiers of the signal sources to survey manager 502. The measurements can include, for example, an RSSI or a round-trip time when signal sources 106, 108, and 110 are wireless access points, a temperature when signal sources 106, 108, and 110 are heat sources, a sound pressure level when signal sources 106, 108, and 110 are sound sources, a light intensity or spectrum when signal sources 106, 108, and 110 are light sources. In addition, signal source interface 504 can provide micro-electro-mechanical systems (MEMS) data to survey manager 502. Survey manager 502 can associate the measurements with locations at a venue based on survey path data received from survey path estimator 506.

Survey manager 502 can receive location path data from survey path estimator 506. Survey path estimator 506 is a component of survey subsystem 500 configured to determine a motion path of sampling device 102. Survey path estimator 506 can determine the motion path based on starting points and motion sensor data from one or more motion sensors of sampling device 102, and a venue map provided by location server interface 508. Survey path estimator 506 can provide the motion path to survey manager 502, which, in turn, can use the motion path and MEMS data to determine locations associated with the measurements.

Survey path estimator 506 can include sensor data normalizer 507. Sensor data normalizer 507 is a component of survey path estimator 506 configured to improve accuracy of location estimation using the motion sensor data. For example, sampling device 102 can determine an estimated location using an average stride length and an accelerometer reading measuring how many steps a surveyor takes. The surveyor may have larger or smaller strides. Accordingly, initially, the estimated location may be incorrect. The surveyor can move the anchor to a correct location, which may be closer to or farther away from a starting location. Based on a difference between the correct location and the initially estimated location, sensor data normalizer 507 can replace the average stride length with a stride length corresponding to the particular surveyor. Accordingly, in an estimate of a next location, sampling device 102 can adapt to this particular surveyor.

Location server interface 508 is a component of survey subsystem 500 configured to receive venue map and, in some implementations, motion path from location server 509. Upon receiving the venue map and survey path, location server interface 508 can submit the venue map and motion path (if any) to survey path estimator 506. If motion path is submitted to survey path estimator 506, survey path estimator 506 can provide the motion path to survey manager 502.

Location server 509 can provide venue service to one or more sampling devices. The venue service can include providing venue maps for downloading, tracking surveys provided by various sampling devices and stitching together multiple surveys conducted at different portions of a same venue. The venue service can interpolate and extrapolate expected readings at unsurveyed space using signal propagation properties and surveyed signals. The venue service can generate location fingerprint data using survey data.

Survey manager 502 can associate measurements received from signal source interface 504 with locations determined based on the survey path data. Survey manager 502 can designate the result as survey data, and provide the survey data to location server interface 508 for submitting to a location server. In some implementations, survey manager 502 can store the survey data in survey data store 510, for submission to the location server later.

Survey subsystem 500 can include survey user interface 512. Survey user interface 512 can provide a venue map (received from location server interface 508) for display on sampling device 102. Survey user interface 512 can provide for display a survey path overlaying on the venue map. Survey user interface 512 can provide various user interface items for receiving user input for designating starting points, locations of measurements, and adjustment of anchors and motion paths.

Exemplary Procedures

Figure 6A:
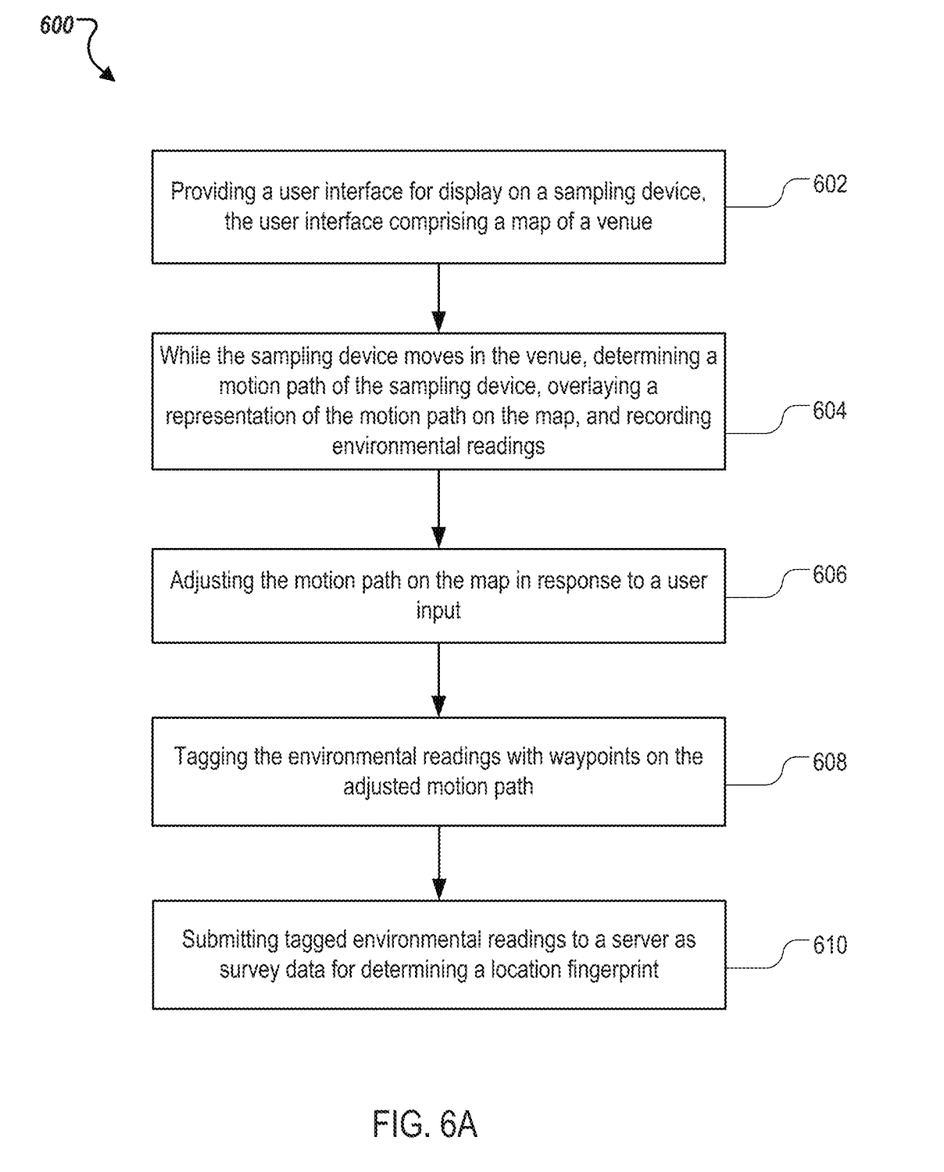
FIG. 6A is a flowchart of an exemplary process of location survey.

FIG. 6A is a flowchart of an exemplary process 600 of location survey. Process 600 can be performed by a sampling mobile device, e.g., sampling device 102 of FIG. 1.

The sampling device can provide (602) a user interface for display on a sampling device, the user interface comprising a map of a venue, the venue comprising a space accessible by a pedestrian and one or more constraints of movement of the pedestrian in the space.

While the sampling device moves in the venue, the sample device can perform operations 604. Operations 604 can include determining a motion path of the sampling device in the venue, overlaying a representation of the motion path on the map, and recording environmental readings by one or more signal sensors of the sampling device.

The motion path can start at a starting location in the venue and ends at an estimated current location of the sampling device. The sampling device can obtain the starting location from a user input on the map or from a previous anchor. The estimated current location can be determined using readings from one or more motion sensors of sampling device.

The one or more motion sensors can include at least one of an accelerometer operable to detect frequency of human footsteps, a gyroscope or a magnetic or electronic compass. The sampling device can determine estimated current location based on a heading of the sampling device and a distance travelled. The sampling can determine the heading using the gyroscope or compass. The sampling device can determine the distance based on the frequency of human footsteps and a stride length for each step. The sampling device can receive a stride length from a server that is determined to be an average human stride length. The sampling device can than adjust the stride length based on user input adjusting the motion path. Upon determining that the user input shortens the distance travelled, the sampling device can reduce the stride length. Upon determining that the user input lengthens the distance travelled, the sampling device can increase the stride length.

Overlaying a representation of the motion path on the map can include animating an end point of the motion path while the sampling device moves and displaying an anchor on the motion path when an estimated moving direction of the sampling device changes.

While the sampling device moves in the venue, the sampling device records environmental readings by one or more signal sensors of the sampling device. The environmental readings can include at least one of readings of RF signals from one or more RF signal sources, readings of a magnetometer, readings of a barometer, or readings of a light sensor or microphone. The readings of RF signals can include RSSIs. Each RF signal source can be a cellular site, a wireless access point, or a Bluetooth device. Recording the environmental readings can include scanning for radio signals at a pre-determined time interval, and recording a set of environmental readings for each scan, including associating a timestamp of the scan with each corresponding set.

The sampling device can adjust (606) the motion path on the map in response to a user input moving the anchor. The adjusted motion path can connect the starting point and moved anchor.

The sampling device can tag (608) the environmental readings with waypoints on the adjusted motion path. Tagging the environmental readings with waypoints can include determining the waypoints according to the timestamps associated with the environmental readings and a distance between the starting point and the adjusted motion path. The sampling device can then tag each set of environmental readings with a corresponding waypoint.

The sampling device can submit (610) tagged environmental readings to a server as survey data for determining a location fingerprint of the venue. A user device can use the location fingerprint to estimate a location of the user device in the venue.

Figure 6B:
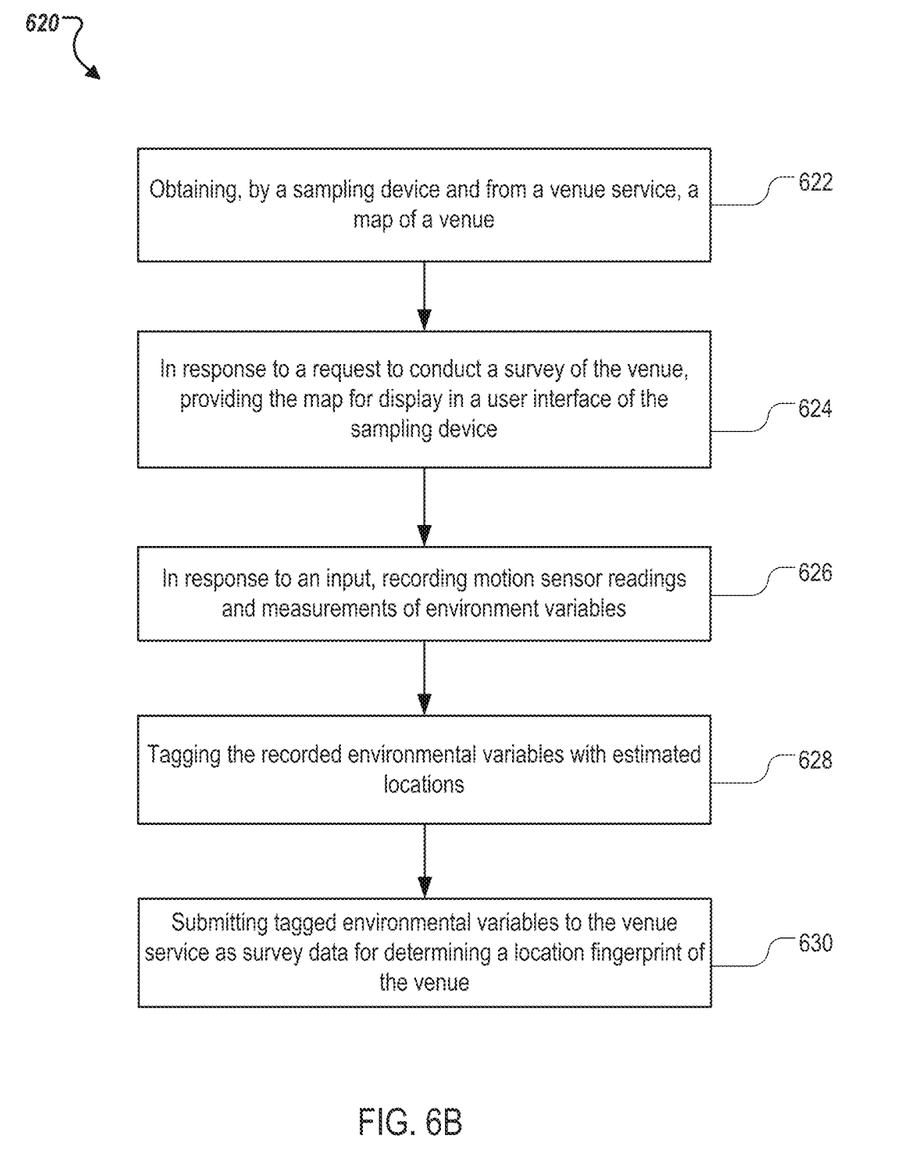
FIG. 6B is a flowchart of an exemplary process of location survey.

FIG. 6B is a flowchart of an exemplary process 620 of location survey. Process 620 can be performed by a sampling mobile device, e.g., sampling device 102 of FIG. 1.

The sampling device can obtain (622) a map of a venue from a venue service. The map can include records of indoor structures and indoor pathways of the venue. The venue service can be provided by a location server. The venue, e.g., a residential, industrial, or commercial complex, can include one or more buildings.

In response to a request to conduct a survey of the venue, the sampling device can provide (624) the map for display in a user interface of the sampling device. The survey can include recording environmental variables from locations in the indoor structures and indoor pathways. The user interface is configured to receive an input from the user identifying a starting location for beginning the recording. The input can be a touch input on the displayed map at a location corresponding to the starting location.

In response to the input, the sampling device can record (626) readings of one or more motion sensors and measurements of environment variables until a termination condition has been satisfied. Recording the environmental variables can include scanning for radio signals at a pre-determined time interval, and recording a set of environmental reading for each scan, including associating a timestamp of the scan with each corresponding set.

The sampling device can use the motion sensor readings to determine an estimated location of the mobile device in the venue while the sampling device records the environment variables. The one or more motion sensors can include an accelerometer operable to detect frequency of human footsteps. The sampling can determine the estimated current location based on a heading of the sampling device and the frequency of human footsteps.

The recorded environmental variables can include readings of RF signals from one or more RF signal sources; readings of a magnetometer; readings of a barometer; or readings of a light sensor or microphone. The readings of RF signals can include RSSI. Each RF signal source can be a cellular site, a wireless access point, or a Bluetooth device. The sampling device can tag (628) the recorded environmental variables with the estimated locations.

The sampling device can submit (630) tagged environmental variables to the venue service as survey data for determining a location fingerprint of the venue. A user device can use the location fingerprint to estimate a location of the user device in the venue.

Exemplary Mobile Device Architecture

Figure 7:
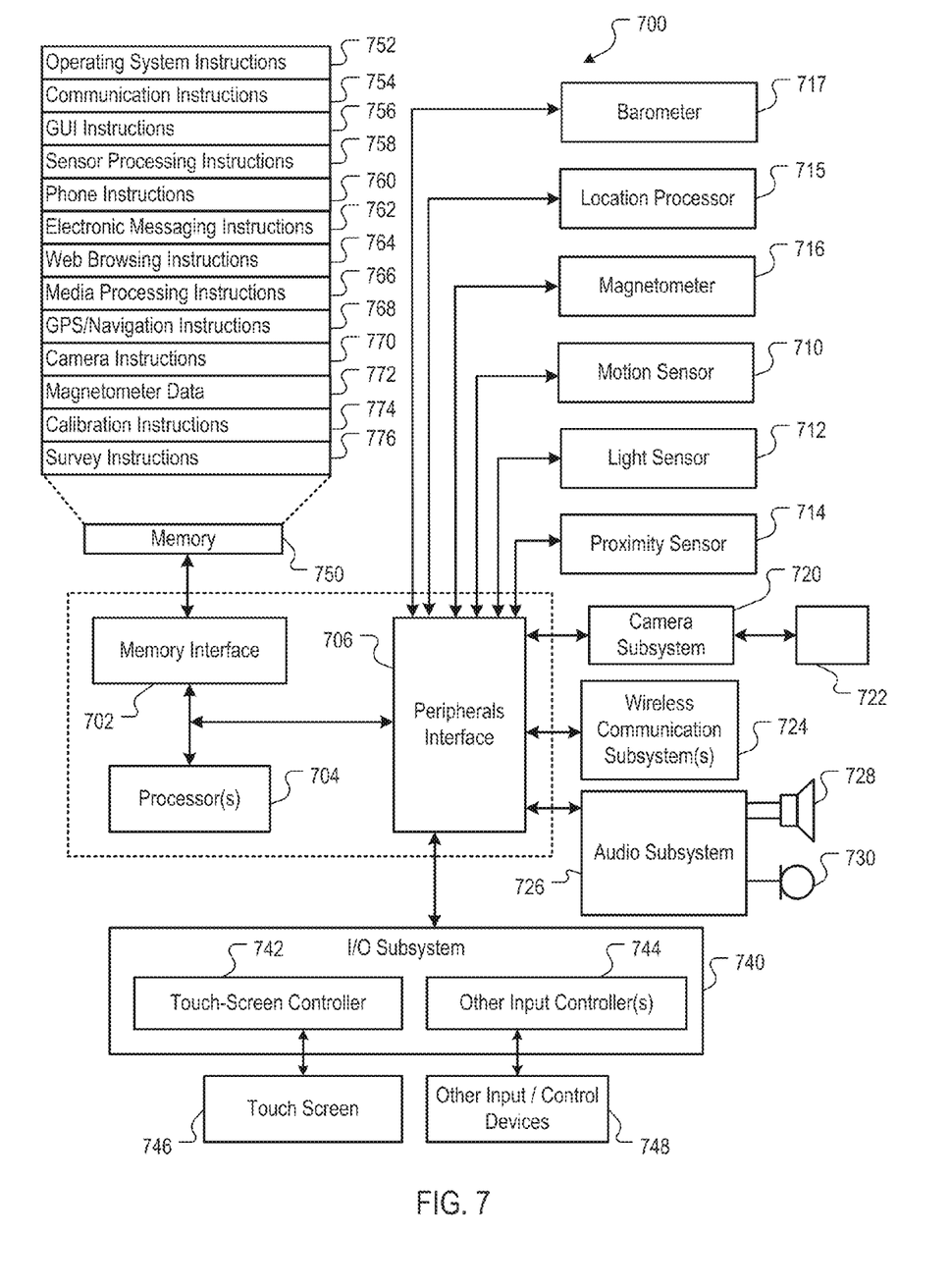
FIG. 7 is a block diagram illustrating an exemplary device architecture of a mobile device implementing the features and operations described in reference to FIGS. 1-6.

FIG. 7 is a block diagram of an exemplary architecture 700 for the mobile devices of FIGS. 1-6. A mobile device (e.g., sampling device 102) can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include application processors, baseband processors, and wireless processors. The various components in sampling device 102, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Motion sensor 710 can include one or more accelerometers configured to determine change of speed and direction of movement of the mobile device. Barometer 717 can include one or more devices connected to peripherals interface 706 and configured to measure pressure of atmosphere around the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a GSM network, a GPRS network, an EDGE network, a Wi-Fi™ or WiMax™ network, and a Bluetooth™ network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions. Audio subsystem 726 can be configured to receive voice commands from the user.

I/O subsystem 740 can include touch surface controller 742 and/or other input controller(s) 744. Touch surface controller 742 can be coupled to a touch surface 746 or pad. Touch surface 746 and touch surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 746. Touch surface 746 can include, for example, a touch screen.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch surface 746; and a pressing of the button for a second duration that is longer than the first duration may turn power to sampling device 102 on or off. The user may be able to customize a functionality of one or more of the buttons. The touch surface 746 can, for example, also be used to implement virtual or soft buttons and/or a keyboard.

In some implementations, sampling device 102 can present recorded audio and/or video files, such as MP3, AAC, and MPEG files. In some implementations, sampling device 102 can include the functionality of an MP3 player. Sampling device 102 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can store surveying instructions 776 that, when executed, can cause processor 704 to perform operations of survey subsystem 500 as described above in reference to FIG. 5, including operations of performing indoor survey at a venue.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
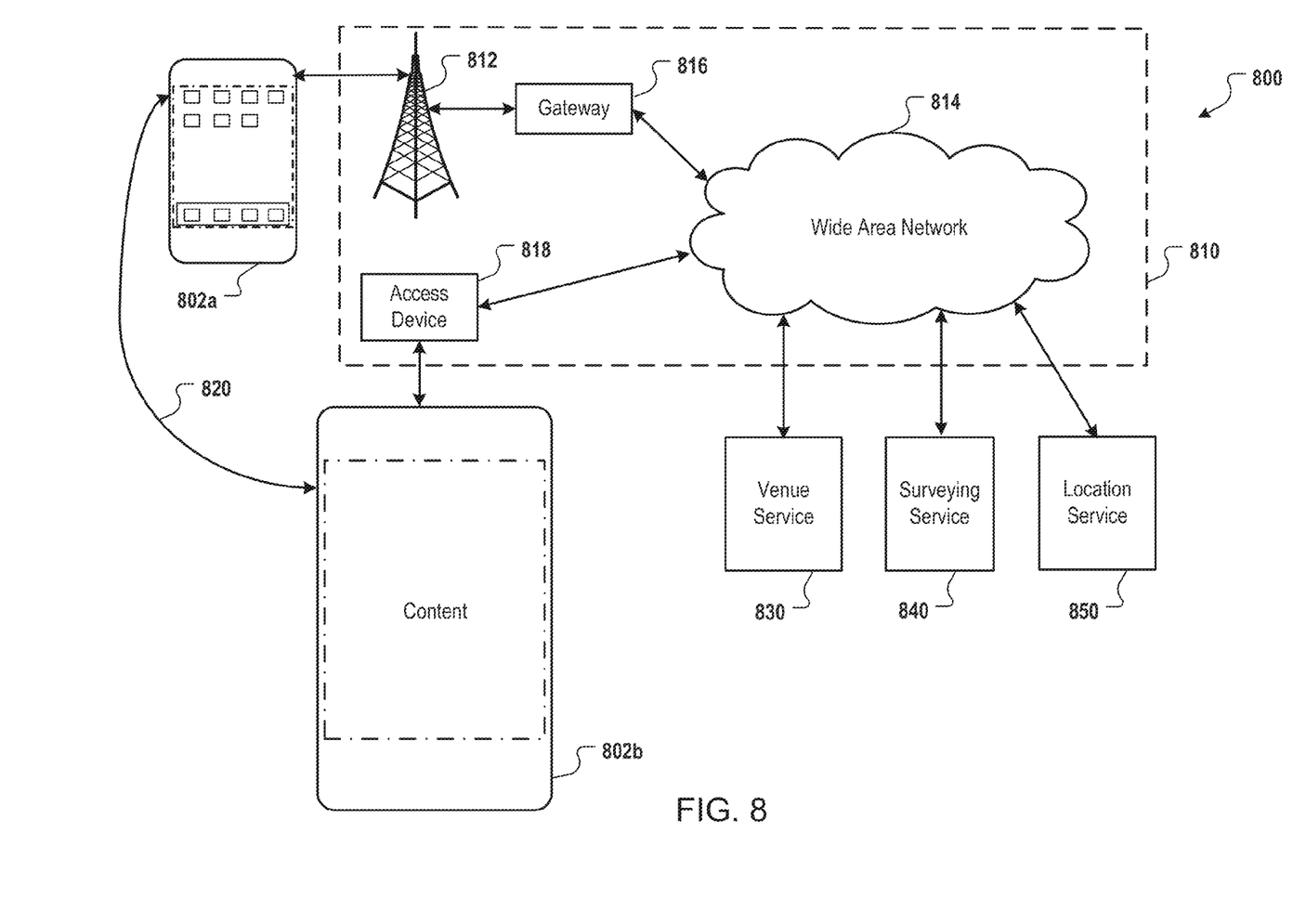
FIG. 8 is a block diagram of an exemplary network operating environment for the mobile devices of FIGS. 1-6.

FIG. 8 is a block diagram of an exemplary network operating environment 800 for the mobile devices of FIGS. 1-6. Mobile devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access point, can provide communication access to the wide area network 814. Each of mobile devices 802a and 802b can be sampling device 102 configured to survey a venue, or another mobile device requesting location services.

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, mobile device 802a or 802b can be physically connected to the access device 818 using one or more cables and the access device 818 can be a personal computer. In this configuration, mobile device 802a or 802b can be referred to as a "tethered" device.

Mobile devices 802a and 802b can also establish communications by other means. For example, wireless device 802a can communicate with other wireless devices, e.g., other mobile devices, cell phones, etc., over the wireless network 812. Likewise, mobile devices 802a and 802b can establish peer-to-peer communications 820, e.g., a personal area network, by use of one or more communication subsystems, such as the Bluetooth™ communication devices. Other communication protocols and topologies can also be implemented.

The mobile device 802a or 802b can, for example, communicate with one or more services 830, 840, and 850 over the one or more wired and/or wireless networks. For example, one or more venue services 830 can provide venue information to mobile devices 802a and 802b. The venue information can include venue identifiers associated with venue maps. Survey service 840 can receive survey data from mobile devices 802a and 802b, and generate location fingerprint data for venues based on the survey data. Location service 850 can provide the location fingerprint data to mobile devices 802a and 802b for determining locations at each venue.

Mobile device 802a or 802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 802a or 802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   providing a user interface for display on a sampling device, the user interface comprising a map of a venue, the venue comprising a space accessible by a pedestrian and one or more constraints of movement of the pedestrian in the space;
   estimating a set of locations while the sampling device moves in the venue;
   determining a motion path of the sampling device in the venue, the motion path starting at a starting location in the venue and ending at an estimated current location of the sampling device, wherein the estimated current location is determined using readings from one or more motion sensors of the sampling device;
   overlaying a representation of the motion path on the map, including animating an end point of the motion path and displaying an anchor on the motion path when an estimated moving direction of the sampling device changes;
   recording environmental readings by one or more signal sensors of the sampling device;
   adjusting the motion path on the map in response to a user input moving the anchor, the adjusted motion path connecting the starting location and the moved anchor;
   tagging the environmental readings with waypoints on the adjusted motion path; and
   submitting the tagged environmental readings to a server as survey data for determining a location fingerprint of the venue, the location fingerprint usable by a user device to estimate a location of the user device in the venue.

2. The method of claim 1, wherein the starting location is obtained from a user input on the map or is represented by an anchor previously provided on the map.

3. The method of claim 1, wherein the one or more motion sensors include an accelerometer operable to detect frequency of human footsteps, and the estimated current location is determined based on the frequency of the human footsteps.

4. The method of claim 1, wherein the environmental readings comprise at least one of:
   readings of radio frequency (RF) signals from one or more RF signal sources;
   readings of a magnetometer;
   readings of a barometer;
   readings of a light sensor; and
   readings of a microphone.

5. The method of claim 4, wherein the readings of the RF signals include received signal strength indicators (RSSIs), and each RF signal source is a cellular site, a wireless access point, or a Bluetooth device.

6. The method of claim 1, wherein
   recording the environmental readings comprises:
   scanning for wireless signals in a plurality of scans at predetermined time intervals;
   recording a set of environmental readings for each of the scans; and
   for each of the scans, associating a timestamp that corresponds to the scan with the set of environmental readings recorded for the scan.

7. The method of claim 6, wherein tagging the environmental readings with waypoints comprises:
   determining the waypoints according to the timestamps and a distance between the starting location and positions on the adjusted motion path; and
   tagging each set of environmental readings with a corresponding waypoint.

8. A method comprising:
   obtaining, by a sampling device and from a venue server, a map of a venue, the map including records of indoor structures and indoor pathways of the venue;
   in response to a request to conduct a survey of the venue, providing the map for display in a user interface of the sampling device, the survey comprising recording environmental variables from locations in the indoor structures and indoor pathways, the user interface operable to receive an input from a user identifying a starting location for beginning the recording;
   in response to the input, recording the environmental variables and readings of one or more motion sensors until a termination condition has been satisfied, the readings usable to determine estimated locations of the sampling device in the venue while the sampling device records the environmental variables, wherein recording the environmental variables comprises:
   scanning for the environmental variables in a plurality of scans;

recording a respective set of measurements of wireless signals for each of the scans; and associating a respective timestamp of each of the scans with the respective set of measurements;

tagging the recorded environmental variables with the estimated locations; and submitting the tagged environmental variables to the venue server as survey data for determining a location fingerprint of the venue, the location fingerprint usable by a user device to estimate a location of the user device in the venue.

9. The method of claim 8, wherein the venue includes one or more buildings.

10. The method of claim 8, wherein the input is a touch input on the displayed map at a location corresponding to the starting location.

11. The method of claim 8, wherein the one or more motion sensors include an accelerometer operable to detect frequency of human footsteps, and the estimated location is determined based on the frequency of the human footsteps.

12. The method of claim 8, wherein the recorded environmental variables comprise at least one of:
readings of radio frequency (RF) signals from one or more RF signal sources;
readings of a magnetometer;
readings of a barometer;
readings of a light sensor; and
readings of a microphone.

13. The method of claim 12, wherein the readings of the RF signals include received signal strength indicators (RSSIs), and each RF signal source is a cellular site, a wireless access point, or a Bluetooth device.

14. The method of claim 8, wherein
the scanning for the environmental variables occurs at predetermined time intervals.

15. A system comprising:
one or more processors; and
at least one non-transitory device storing computer instructions operable to cause the one or more processors to perform operations comprising:
providing a user interface for display on a sampling device, the user interface comprising a map of a venue, the venue comprising a space accessible by a pedestrian and one or more constraints of movement of the pedestrian in the space;
estimating a set of locations while the sampling device moves in the venue;
determining a motion path of the sampling device in the venue, the motion path starting at a starting location in the venue and ending at an estimated current location of the sampling device, wherein the estimated current location is determined using readings from one or more motion sensors of the sampling device;
overlaying a representation of the motion path on the map, including animating an end point of the motion path and displaying an anchor on the motion path when an estimated moving direction of the sampling device changes;
recording environmental readings by one or more signal sensors of the sampling device;
adjusting the motion path on the map in response to a user input moving the anchor, the adjusted motion path connecting the starting location and the moved anchor;
tagging the environmental readings with waypoints on the adjusted motion path; and
submitting the tagged environmental readings to a server as survey data for determining a location fingerprint of the venue, the location fingerprint usable by a user device to estimate a location of the user device in the venue.

16. The system of claim 15, wherein the starting location is obtained from a user input on the map or is represented by an anchor previously provided on the map.

17. The system of claim 15, wherein the one or more motion sensors include an accelerometer operable to detect frequency of human footsteps, and the estimated current location is determined based on the frequency of the human footsteps.

18. The system of claim 15, wherein the environmental readings comprise at least one of:
readings of radio frequency (RF) signals from one or more RF signal sources;
readings of a magnetometer;
readings of a barometer;
readings of a light sensor; and
readings of a microphone.

19. The system of claim 18, wherein the readings of the RF signals include received signal strength indicators (RSSIs), and each RF signal source is a cellular site, a wireless access point, or a Bluetooth device.

20. The system of claim 15, wherein
recording the environmental readings comprises:
scanning for wireless signals in a plurality of scans at predetermined time intervals;
recording a set of environmental readings for each of the scans; and
for each of the scans, associating a timestamp that corresponds to the scan with the set of environmental readings recorded for the scan.

21. The system of claim 20, wherein tagging the environmental readings with waypoints comprises:
determining the waypoints according to the timestamps and a distance between the starting location and positions on the adjusted motion path; and
tagging each set of environmental readings with a corresponding waypoint.

22. A system comprising:
one or more processors; and
at least one non-transitory device storing computer instructions operable to cause the one or more processors to perform operations comprising:
obtaining, by a sampling device and from a venue server, a map of a venue, the map including records of indoor structures and indoor pathways of the venue;
in response to a request to conduct a survey of the venue, providing the map for display in a user interface of the sampling device, the survey comprising recording environmental variables from locations in the indoor structures and indoor pathways, the user interface operable to receive an input from a user identifying a starting location for beginning the recording;
in response to the input, recording the environmental variables and readings of one or more motion sensors until a termination condition has been satisfied, the readings usable to determine estimated locations of the sampling device in the venue while the sampling device records the environmental variables, wherein recording the environmental variables comprises:
scanning for the environmental variables in a plurality of scans;

recording a respective set of measurements of wireless signals for each of the scans; and associating a respective timestamp of each of the scans with the respective set of measurements;

tagging the recorded environmental variables with the estimated locations; and submitting the tagged environmental variables to the venue server as survey data for determining a location fingerprint of the venue, the location fingerprint usable by a user device to estimate a location of the user device in the venue.

23. The system of claim 22, wherein the venue includes one or more buildings.

24. The system of claim 22, wherein the input is a touch input on the displayed map at a location corresponding to the starting location.

25. The system of claim 22, wherein the one or more motion sensors include an accelerometer operable to detect frequency of human footsteps, and the estimated location is determined based on the frequency of the human footsteps.

26. The system of claim 22, wherein the recorded environmental variables comprise at least one of:

readings of radio frequency (RF) signals from one or more RF signal sources;

readings of a magnetometer;

readings of a barometer;

readings of a light sensor; and readings of a microphone.

27. The system of claim 26, wherein the readings of the RF signals include received signal strength indicators (RSSIs), and each RF signal source is a cellular site, a wireless access point, or a Bluetooth device.

28. The system of claim 22, wherein the scanning for the environmental variables occurs at predetermined time intervals.

29. At least one non-transitory storage device storing computer instructions operable to cause one or more processors to perform operations comprising:

obtaining, by a sampling device and from a venue server, a map of a venue, the map including records of indoor structures and indoor pathways of the venue;

in response to a request to conduct a survey of the venue, providing the map for display in a user interface of the sampling device, the survey comprising recording environmental variables from locations in the indoor structures and indoor pathways, the user interface operable to receive an input from a user identifying a starting location for beginning the recording;

in response to the input, recording the environmental variables and readings of one or more motion sensors until a termination condition has been satisfied, the readings usable to determine estimated locations of the sampling device in the venue while the sampling device records the environmental variables, wherein recording the environmental variables comprises:

scanning for the environmental variables in a plurality of scans;

recording a respective set of measurements of wireless signals for each of the scans; and associating a respective timestamp of each of the scans with the respective set of measurements;

tagging the recorded environmental variables with the estimated locations; and submitting the tagged environmental variables to the venue server as survey data for determining a location fingerprint of the venue, the location fingerprint usable by a user device to estimate a location of the user device in the venue.

30. The non-transitory storage device of claim 29, wherein the venue includes one or more buildings.

31. The non-transitory storage device of claim 29, wherein the input is a touch input on the displayed map at a location corresponding to the starting location.

32. The non-transitory storage device of claim 29, wherein the one or more motion sensors include an accelerometer operable to detect frequency of human footsteps, and the estimated location is determined based on the frequency of the human footsteps.

33. The non-transitory storage device of claim 29, wherein the recorded environmental variables comprise at least one of:

readings of radio frequency (RF) signals from one or more RF signal sources;

readings of a magnetometer;

readings of a barometer;

readings of a light sensor; and readings of a microphone.

34. The non-transitory storage device of claim 33, wherein the readings of the RF signals include received signal strength indicators (RSSIs), and each RF signal source is a cellular site, a wireless access point, or a Bluetooth device.

35. The non-transitory storage device of claim 29, wherein the scanning for the environmental variables occurs at predetermined time intervals.

36. At least one non-transitory storage device storing computer instructions operable to cause one or more processors to perform operations comprising:

providing a user interface for display on a sampling device, the user interface comprising a map of a venue, the venue comprising a space accessible by a pedestrian and one or more constraints of movement of the pedestrian in the space;

estimating a set of locations while the sampling device moves in the venue;

determining a motion path of the sampling device in the venue, the motion path starting at a starting location in the venue and ending at an estimated current location of the sampling device, wherein the estimated current location is determined using readings from one or more motion sensors of the sampling device;

overlaying a representation of the motion path on the map, including animating an end point of the motion path and displaying an anchor on the motion path when an estimated moving direction of the sampling device changes;

recording environmental readings by one or more signal sensors of the sampling device;

adjusting the motion path on the map in response to a user input moving the anchor, the adjusted motion path connecting the starting location and the moved anchor;

tagging the environmental readings with waypoints on the adjusted motion path; and submitting the tagged environmental readings to a server as survey data for determining a location fingerprint of the venue, the location fingerprint usable by a user device to estimate a location of the user device in the venue.

37. The non-transitory storage device of claim 36, wherein the starting location is obtained from a user input on the map or is represented by an anchor previously provided on the map.

38. The non-transitory storage device of claim 36, wherein the one or more motion sensors include an accelerometer operable to detect frequency of human footsteps, and the estimated current location is determined based on the frequency of the human footsteps.

39. The non-transitory storage device of claim 36, wherein the environmental readings comprise at least one of:
readings of radio frequency (RF) signals from one or more RF signal sources;
readings of a magnetometer;
readings of a barometer;
readings of a light sensor; and
readings of a microphone.

40. The non-transitory storage device of claim 39, wherein the readings of the RF signals include received signal strength indicators (RSSIs), and each RF signal source is a cellular site, a wireless access point, or a Bluetooth device.

41. The non-transitory storage device of claim 36, wherein
recording the environmental readings comprises:
scanning for wireless signals in a plurality of scans at predetermined time intervals;
recording a set of environmental readings for each of the scans; and
for each of the scans, associating a timestamp that corresponds to the scan with the set of environmental readings recorded for the scan.

42. The non-transitory storage device of claim 41, wherein tagging the environmental readings with waypoints comprises:
determining the waypoints according to the timestamps and a distance between the starting location and positions on the adjusted motion path; and
tagging each set of environmental readings with a corresponding waypoint.

* * * * *